US011584819B2

(12) United States Patent
Favero et al.

(10) Patent No.: US 11,584,819 B2
(45) Date of Patent: Feb. 21, 2023

(54) AUTO-INVERTIBLE INVERSE POLYMER EMULSION

(71) Applicant: SPCM SA, Andrezieux Boutheon (FR)

(72) Inventors: Cédrick Favero, Andrezieux Boutheon (FR); Olivier Braun, Andrezieux Boutheon (FR); Thierry Leblanc, Andrezieux Boutheon (FR)

(73) Assignee: SPCM SA, Andrezieux Boutheon (FR)

( * ) Notice: Subject to any disclaimer, the term of this patent is extended or adjusted under 35 U.S.C. 154(b) by 0 days.

(21) Appl. No.: 17/288,962

(22) PCT Filed: Nov. 4, 2019

(86) PCT No.: PCT/FR2019/052606
§ 371 (c)(1),
(2) Date: Apr. 27, 2021

(87) PCT Pub. No.: WO2020/094960
PCT Pub. Date: May 14, 2020

(65) Prior Publication Data
US 2021/0355258 A1    Nov. 18, 2021

(30) Foreign Application Priority Data

Nov. 6, 2018 (FR) ...................................... 1860204

(51) Int. Cl.
*E21B 43/267* (2006.01)
*E21B 43/20* (2006.01)
(Continued)

(52) U.S. Cl.
CPC ............ *C08F 220/56* (2013.01); *C09K 8/588* (2013.01); *C09K 8/64* (2013.01); *C09K 8/80* (2013.01);
(Continued)

(58) Field of Classification Search
None
See application file for complete search history.

(56) References Cited

U.S. PATENT DOCUMENTS 8,383,560 B2    2/2013  Pich et al.
2002/0017493 A1*  2/2002  Ehrnsperger .......... D06M 23/06
                                                            210/660

(Continued)

FOREIGN PATENT DOCUMENTS

WO         02/055607 A1    7/2002
WO      2014/047243 A1    3/2014
WO      2018/020175 A1    2/2018

OTHER PUBLICATIONS

International Search Report (and English translation) and Written Opinion of the International Searching Authority for International Application No. PCT/FR2019/052606 dated Feb. 3, 2020.

(Continued)

*Primary Examiner* — Charles R Nold
(74) *Attorney, Agent, or Firm* — Heslin Rothenberg Farley & Mesiti P.C.

(57) ABSTRACT

The invention relates to an inverse polymer emulsion having the particular feature of auto-inverting without any need for the use of an inverting agent and containing a polymer of at least one water-soluble monomer and at least one LCST macromonomer. The invention also relates to the use of the inverse emulsion in the fields of the oil and gas industry, water treatment, slurry treatment, paper manufacturing, construction, mining, cosmetics, textiles, detergents or agriculture.

8 Claims, 4 Drawing Sheets

(51) Int. Cl.
*C09K 8/588* (2006.01)
*C09K 8/64* (2006.01)
*C09K 8/80* (2006.01)
*C08F 220/56* (2006.01)

(52) U.S. Cl.
CPC ............ *E21B 43/20* (2013.01); *E21B 43/267* (2013.01); *C08F 2800/10* (2013.01)

(56) References Cited

U.S. PATENT DOCUMENTS

| | | | | |
|---|---|---|---|---|
| 2002/0165307 | A1* | 11/2002 | Huang | C08F 291/00 524/521 |
| 2013/0056213 | A1* | 3/2013 | Medvedev | C09K 8/685 166/308.5 |
| 2013/0324443 | A1* | 12/2013 | Wang | C08F 220/18 507/121 |
| 2016/0056213 | A1* | 2/2016 | Kwak | G09G 3/3208 315/161 |

OTHER PUBLICATIONS

Griffin, W.C., "Classification of Surface-Active Agents by 'HLB'", Journal of the Society of Cosmetic Chemists 1 (1949): 311-326.

\* cited by examiner

AUTO-INVERTIBLE INVERSE POLYMER EMULSION

CROSS REFERENCE TO RELATED APPLICATIONS

This application is a national stage filing under section 371 of International Application No. PCT/FR2019/052606 filed on Nov. 4, 2019, and published on May 14, 2020 as WO 2020/094960, which claims priority to French Application No. 1860204, filed on Nov. 6, 2018. The entire contents of WO 2020/094960 are hereby incorporated herein by reference.

FIELD OF THE INVENTION

The present invention relates to the technical field of polymers as a water-in-oil emulsion, otherwise known as an inverse emulsion. More specifically, the invention relates to an inverse polymer emulsion having the particular feature of auto-inverting without requiring the use of an inverting agent.

The invention also relates to the use of this inverse emulsion in various fields such as the oil and gas, water treatment, slurry treatment, paper manufacturing, construction, mining, cosmetics, textiles, detergents, and agriculture industries.

PRIOR STATE OF THE ART

Inverse polymer emulsions are widely used in various fields such as water treatment, enhanced oil recovery and hydraulic fracturing.

The use of these inverse emulsions is based on dissolving the polymer in water or brine. To that end, the inverse emulsion inverts so as to release the polymer contained in the aqueous phase of the inverse emulsion. After release, the polymer is in the water or brine to which the inverse emulsion was added. To date, this inverse emulsion inversion step involves the presence of inverting agents, which are generally hydrophilic surfactants with a high HLB, generally greater than 10.

The presence of hydrophilic surfactants in an inverse polymer emulsion may affect the viscosity and/or stability parameters of the inverse emulsion. This results in significant increases in the viscosity of the inverse emulsion (which can lead to caking) or by an acceleration of the phase separation (sedimentation of the polymer particles and occurrence of an oily phase on the surface).

On the other hand, it is acknowledged that most hydrophilic surfactants are ethoxylated products which may present environmental problems.

In addition, the hydrophilic surfactants must be selected specifically according to the composition of the medium in which the inverse emulsion is implemented (water or brine), and according to the temperature of this medium, which requires a complex adjustment process for the hydrophilic surfactant to act as an inverting agent.

Thus, it would be advantageous to have an inverse emulsion which can invert without using an inverting agent. Therefore, the problem which the present invention proposes to solve is to provide an inverse emulsion which auto-inverts without requiring the use of an inverting agent such as an oil-in-water surfactant.

DISCLOSURE OF THE INVENTION

The applicant surprisingly discovered that the introduction of macromonomer with lower critical solution temperature (LCST) in the polymer during its synthesis in inverse emulsion could give the inverse emulsion an auto-inversion property.

This auto-inversion property means that the polymer dissolves in water (or brine) without necessarily resorting to the use of an inverting agent such as an oil-in-water surfactant. In addition, this emulsion can rapidly invert even under conditions of high temperature and/or high salinity, which is of great interest, particularly in the fields of oil and gas recovery.

More specifically, the present invention relates to an auto-invertible inverse emulsion comprising:
 an oil,
 some water,
 at least one water-in-oil surfactant,
 at least one polymer containing monomer units of at least one water-soluble monomer and at least one LCST macromonomer.

The inverse emulsion according to the invention is advantageously free of oil-in-water surfactant.

The present invention also relates to a polymeric aqueous solution obtained by inversion of the inverse emulsion described above. The inversion is advantageously carried out in the absence of an oil-in-water surfactant. It also relates to the use of the inverse emulsion described above to thicken an aqueous medium, or to flocculate suspended particles or reduce the level of frictional resistance during transport of an aqueous medium.

Finally, the present invention also relates to the use of the inverse emulsion described above for the recovery of oil and gas, or for the treatment of water, or for the treatment of slurry, or for the manufacture of paper, or in construction, or in the mining industry, or in the formulation of cosmetics, or in the formulation of detergents, or in the manufacture of textiles, or in agriculture.

Polymer

The polymer in the inverse emulsion is generally water-soluble or water-swelling. The term "water-soluble polymer" is understood to mean a polymer which gives an aqueous solution when it is dissolved under stirring at 25° C. and with a concentration of 50 g·L$^{-1}$ in water. The term "water-swelling polymer" is understood to mean a polymer which swells and thickens an aqueous solution (water) in which it is placed at 25° C.

The polymer is a polymer of at least one water-soluble monomer and at least one LCST macromonomer. In other words, the polymer is obtained from at least one water-soluble monomer and at least one LCST macromonomer. Therefore, it contains monomer units derived from the monomer(s) and macromonomer(s) mentioned. In other words, the polymer of the inverse emulsion according to the invention is a polymer of at least one water-soluble monomer bearing at least one unsaturated function (advantageously, a vinyl group R1R2C=CR3-, R1, R2 and R3 being independently of one another a hydrogen atom or a hydrocarbon or a non-hydrocarbon group which may comprise heteroatoms) which might be polymerized to form a backbone, and of at least one LCST macromonomer. Thus, the polymer comprises units derived from the water-soluble monomer and units derived from the LCST macromonomer.

As defined by IUPAC, a macromonomer is a polymer or oligomer bearing a terminal group that acts as a monomer, thus each polymer or oligomer corresponds to a monomer unit in the final polymer chain.

According to an advantageous embodiment, the molar percentage of units (monomer units) derived from LCST macromonomers in the polymer is between $10^{-5}$ and 5 mol % ($\geq 10^{-5}$ mol % and $\leq 5$ mol %) relative to the total number of moles of monomer units of water-soluble monomer(s) and LCST macromonomer(s), preferably between $10^{-4}$ and 1 mol %. This percentage is preferably greater than $10^{-3}$ mol % ($\geq 10^{-3}$ mol %), even more preferably greater than $5.10^{-3}$ mol %. This percentage is preferably less than 1 mol % relative to the total number of moles of monomer units of water-soluble monomer(s) and LCST macromonomer(s), preferably less than 0.1 mol %, preferably less than $8.10^{-2}$ mol %, more preferably less than $6.10^{-2}$ mol %, even more preferably less than $5.10^{-2}$ mol %, even more preferably less than $4.10^{-2}$ mol %.

In general, the amount of monomer units of a monomer (monomer or macromonomer) corresponds to the amount of this monomer used in the preparation of the polymer. This definition is applicable for the preparation of the water-soluble copolymer or the macromonomer and, therefore, of the oligomer (see below).

According to an embodiment of the invention, the polymer may be obtained by polymerizing at least one water-soluble monomer bearing at least one unsaturated function and at least one LCST macromonomer. In other words, the water-soluble monomer(s) and the LCST macromonomers are polymerized at the same time in a reactor. The polymer chain is formed gradually in the presence of water-soluble monomers and LCST macromonomers.

According to another embodiment, a water-soluble prepolymer, called a backbone, is first obtained by polymerizing the water-soluble monomers, then, in a second step, the LCST oligomers are grafted onto said prepolymer. A person skilled in the art is familiar with the techniques for grafting LCST macromonomers onto a polymer. Mention may be made, for example, of patent application WO 2014/047243 which discloses this technique.

According to a third embodiment, the polymer may be obtained by polymerizing water-soluble monomers on a structured LCST macromonomer obtained by controlled radical polymerization (RAFT) in the presence of LCST monomers and at least one crosslinking agent. Therefore, the polymers thus obtained are in a star-shaped form with an LCST core. The crosslinking agent may, in particular, be selected from the group comprising polyethylene unsaturated monomers (having at least two C=C unsaturated functions), such as, for example, vinyl, allylic and acrylic functions and mention may be made, for example, of methylene bis acrylamide (MBA).

The polymer may also be obtained by the same technique but without using a crosslinking agent for obtaining the macromonomer by controlled radical polymerization (RAFT).

Of course, methods other than these two methods for obtaining the polymer may be used without departing from the scope of the invention.

The water-soluble monomers which may be used are preferably selected from nonionic monomers, anionic monomers, cationic monomers and zwitterionic monomers. Preferably, they are selected from nonionic, anionic and cationic monomers.

The water-soluble monomer may be a nonionic monomer which may, in particular, be selected from the group comprising vinyl monomers soluble in water, and particularly acrylamide; methacrylamide; N-vinylformamide; and N-vinylpyrrolidone. Advantageously, at least one water-soluble monomer is acrylamide.

At least one water-soluble monomer may also be an anionic monomer. The anionic monomer(s) which may be used in the context of the invention may be selected from a large group. These monomers may have at least one function among the vinyl functions (for example, acrylic, maleic, fumaric, itaconic, allylic) or a malonic function, and they may contain at least one group from carboxylate, phosphonate, phosphate, sulfate, sulfonate groups, or another anionically charged group. The anionic monomer may be in acid form or else in the form of an alkaline earth metal or an alkali metal or ammonium (in particular, quaternary ammonium) salt. Examples of anionic monomers are acrylic acid; methacrylic acid; itaconic acid; crotonic acid; maleic acid; fumaric acid; monomers of strong acid type exhibiting, for example, a function of sulfonic acid or phosphonic acid type, such as 2-acrylamido 2-methylpropanesulfonic acid, vinylsulfonic acid, vinylphosphonic acid, allylsulfonic acid, allylphosphonic acid, styrene sulfonic acid; and the water-soluble salts of these monomers such as their alkali metal, alkaline earth metal, or ammonium (especially quaternary ammonium) salts.

At least one water-soluble monomer may optionally be a cationic monomer of vinyl type (for example, acrylamide, acrylic, allylic or maleic) having at least one ammonium function (for example, a quaternary ammonium). Mention may be made, in particular and without limitation, of quaternized or salified dimethylaminoethyl acrylate (ADAME); quaternized or salified dimethylaminoethyl methacrylate (MADAME); dimethyldiallylammonium chloride (DADMAC); acrylamido propyltrimethyl ammonium chloride (APTAC); and methacrylamido propyltrimethyl ammonium chloride (MAPTAC).

Monomers of hydrophobic nature may also be used as a comonomer for the preparation of the polymer, but at a concentration by weight based on the total monomer content of preferably less than 5%. They are preferably selected from the group comprising esters of (meth)acrylic acid having an alkyl, arylalkyl or ethoxylated chain; (meth)acrylamide derivatives having an alkyl, arylalkyl or dialkyl chain; cationic allylic derivatives; anionic or cationic hydrophobic (meth)acryloyl derivatives; and derivatives of anionic or cationic monomers of (meth)acrylamide carrying a hydrophobic chain. The alkyl chains are advantageously C8-C16. Most preferred is bromoalkylated C8-C16 methacrylamide.

It is also possible to use a branching agent or a crosslinking agent. Such an agent is, for example, selected from methylene-bis-acrylamide (MBA), ethylene glycol diacrylate, tetraallyl ammonium polyethylene glycol chloride, diacrylamide, cyanomethyl acrylate, epoxies and mixtures thereof.

It is also possible to use a free radical chain transfer agent, also known as a chain stopper. The use of a chain transfer agent is particularly advantageous for controlling the molecular weight of the polymer obtained. By way of example of a transfer agent, mention may be made of methanol, isopropanol, sodium hypophosphite, 2-mercaptoethanol, sodium methallylsulphonate, and mixtures thereof. A person skilled in the art will adjust in a known manner the amounts of branching agent, and optionally of transfer agent or branching agent.

The polymer may be obtained by radical polymerization in inverse emulsion.

Polymerization techniques such as controlled radical polymerization known as RAFT (Reversible-Addition Fragmentation chain Transfer), NMP (Nitroxide Mediated Polymerization) or ATRP (Atom Transfer Radical Polymerization), may be used to obtain the polymer.

According to the invention, the polymer has a molecular weight advantageously of at least 0.5 million g/mol, preferably between 0.5 and 40 million g/mol, more preferably between 5 and 30 million g/mol. Molecular weight is referred to as weight average molecular weight.

Molecular weight is determined by the intrinsic viscosity of the polymer. The intrinsic viscosity may be measured by methods known to a person skilled in the art and may be calculated from the values of reduced viscosity for different polymer concentrations by a graphic method consisting in recording the values of reduced viscosity (y-axis) on the concentration (x-axis) and extrapolating the curve to zero concentration. The intrinsic viscosity value is recorded on the y-axis or using the least squares method. The molecular weight may then be determined by the Mark-Houwink equation:

$$[\eta]=K M^\alpha$$

$[\eta]$ represents the intrinsic viscosity of the polymer determined by the solution viscosity measurement method, K represents an empirical constant ($K=3.73.10^{-4}$), M represents the molecular weight of the polymer, $\alpha$ represents the Mark-Houwink coefficient ($\alpha=+0.66$), K and $\alpha$ depend on the particular polymer-solvent system.

LCST Macromonomer and its Synthesis

According to the general knowledge of a person skilled in the art, the LCST groups correspond to groups whose solubility in water for a determined concentration is modified beyond a certain temperature and based on the salinity. These are groups exhibiting a transition temperature by heating that defines their lack of affinity with the solvent medium. Lack of solvent affinity results in clouding or loss of transparency.

The minimum transition temperature is called "LCST" (Lower Critical Solution Temperature). For each LCST group concentration, a transition temperature by heating is observed. It is greater than the LCST which is the minimum point of the curve. Below this temperature, the polymer is soluble in water, above this temperature, the polymer loses its solubility in water.

The LCST may be measured visually in the usual manner: the temperature is determined when the cloud point appears, which is when the lack of affinity with the solvent occurs. The cloud point corresponds to the clouding or loss of transparency of the solution.

The LCST may also be determined according to the type of phase transition, for example by DSC (Differential Scanning calorimetry), by a transmittance measurement or by a viscosity measurement.

Preferably, the LCST is determined by determining the cloud point by transmittance according to the following protocol.

The transition temperature is measured for an LCST compound for a solution having a mass concentration of 1% by weight of said compound in deionized water. The cloud point corresponds to the temperature at which the solution has a transmittance equal to 85% of light rays having a wavelength between 400 and 800 nm.

In other words, the temperature at which the solution has 85% transmittance corresponds to the minimum LCST transition temperature of the compound, in this case, from the LCST macromonomer.

In general, a transparent composition has a maximum light transmittance value, regardless of the wavelength between 400 and 800 nm, through a 1-cm-thick sample, of at least 85%, preferably at least 90%. This is the reason why the cloud point corresponds to a transmittance of 85%.

In general, the LCST macromonomer is obtained by synthesis of an LCST oligomer having a functional end, then by grafting an ethylenic group onto this functional end.

Mention may thus be made, by way of example, of the synthesis of the LCST macromonomer from an LCST oligomer of controlled size and functionality, carried out using a radical or ionic initiator having the desired chemical function, and/or by introducing a transfer agent substituted by the desired chemical group and/or by polycondensation.

The LCST monomers which may be used to produce the LCST oligomer, which is used to obtain the LCST macromonomer, are preferably selected from N-isopropylacrylamide; N,N-dimethylacrylamide; acryloyl morpholine; N,N-diethyl acrylamide; N-tert-butyl acrylamide; N-vinyl caprolactam; and diacetone acrylamide.

In the context of the invention, the LCST oligomer advantageously comprises between 10 mol % and 100 mol % of monomer(s) comprising an LCST unit, more advantageously between 40 mol % and 100 mol % and even more advantageously between 50 mol % and 100 mol % relative to the total number of moles of monomers in the oligomer. According to a particular embodiment, the LCST oligomer may, in particular, comprise 90 to 96 mol % of monomer(s) comprising an LCST unit.

In addition to the LCST monomers, the water-soluble monomers which may be used to make the LCST oligomer are preferably selected from nonionic monomers, anionic monomers, cationic monomers and zwitterionic monomers. Preferably, they are selected from nonionic monomers and anionic monomers.

In the context of the invention, the LCST oligomer advantageously comprises between 0 mol % and 90 mol % of this (these) (nonionic and/or anionic and/or cationic and/or zwitterionic) monomer(s), more advantageously between 0 mol % and 60 mol % and even more advantageously between 0 mol % and 50 mol % relative to the total number of moles of monomers in the oligomer. According to a particular embodiment, the LCST oligomer may, in particular, comprise 4 to 10 mol % of this (these) monomer(s). These monomers may be hydrophilic or hydrophobic in nature.

Thus, the LCST oligomer, and therefore the LCST macromonomer, is obtained from at least one LCST monomer and, optionally, at least one water-soluble monomer. Therefore, it contains monomer units derived from the monomer(s) and macromonomer(s) mentioned.

The water-soluble monomer may be a nonionic monomer which may, in particular, be selected from the group comprising vinyl monomers soluble in water, and particularly acrylamide. Thus, the LCST oligomer may comprise a nonionic monomer advantageously selected from the group comprising acrylamide; methacrylamide; N-vinylformamide; and N-vinylpyrrolidone.

The water-soluble monomer of the LCST oligomer may also be an anionic monomer. The anionic monomer(s) of the LCST oligomer may be selected from a broad group. These monomers may have at least one function from vinyl functions (such as, acrylic, maleic, fumaric, itaconic, allylic) or a malonic function, and may contain at least one group from the carboxylate, phosphonate, phosphate, sulphate, sulphonate groups, or another anionically charged group. The anionic monomer of the LCST oligomer may be in acid form or in the form of an alkaline earth metal or an alkali metal or ammonium salt (in particular, quaternary). Examples of suitable monomers include acrylic acid; methacrylic acid; itaconic acid; crotonic acid; maleic acid; fumaric acid; monomers of strong acid type exhibiting, for example, a function of sulfonic acid or phosphonic acid type, such as 2-acrylamido 2-methylpropanesulfonic acid, vinylsulfonic acid, vinylphosphonic acid, allylsulfonic acid, allylphosphonic acid, styrene sulfonic acid; and the water-soluble salts of these monomers such as their alkali metal, alkaline earth metal or ammonium (in particular quaternary) salts.

Optionally, the LCST oligomer may include at least one cationic monomer.

The monomer of the LCST oligomer may optionally be a cationic monomer of vinyl type (for example, acrylamide, acrylic, allylic or maleic) having a quaternary ammonium function. Mention may be made, in particular and without limitation, of quaternized or salified dimethylaminoethyl acrylate (ADAME); quaternized or salified dimethylaminoethyl methacrylate (MADAME); dimethyldiallylammonium chloride (DADMAC); acrylamido propyltrimethyl ammonium chloride (APTAC); and methacrylamido propyltrimethyl ammonium chloride (MAPTAC).

Hydrophobic monomers may also be used to prepare the LCST oligomer. They may be selected, in particular, from vinyl type monomers (for example acrylamide, acrylic, allylic or maleic) having a pendant hydrophobic function. It may, in particular, be the butyl methacrylate monomer.

According to a preferred embodiment, the LCST oligomer is a polymer of an LCST monomer (preferably N-isopropylacrylamide), of an anionic monomer (preferably acrylic acid) and of a hydrophobic monomer (preferably butyl methacrylate).

Thus, according to another preferred embodiment, the LCST oligomer is a polymer of an LCST monomer (preferably N-isopropylacrylamide), of a cationic monomer (preferably MADAME.MeCl) and of a hydrophobic monomer (preferably butyl methacrylate).

As regards the synthesis of the LCST macromonomer, in a first step, mention may be made of telomerization, which is a method of synthesizing an LSCT oligomer with low molar masses (called telomers).

According to the invention, the LCST macromonomer has a molecular weight preferably between 500 g/mol and 200,000 g/mol, more preferably between 1,000 g/mol and 100,000 g/mol, even more preferably between 1,500 g/mol and 100,000 g/mol. Molecular weight is referred to as weight average molecular weight.

The telogen agents may be selected, inter alia, from thiols, alcohols, disulfides, phosphorus derivatives, boron derivatives and halogen derivatives. They may, in particular, make it possible to introduce specific functions at the end of the telomer chains, for example silane, trialkoxysilane, amine, epoxy, hydroxyl, phosphonate or acid functions.

Once these LCST oligomers have been formed, in a second step, a vinyl double bond (R1R2C=CR3-, R1, R2 and R3 being, independently of one another, a hydrogen atom or a hydrocarbon or a non-hydrocarbon group, which may comprise heteroatoms) may be introduced at the end of the chain so that they serve as LCST macromonomers which, in turn, may be polymerized.

According to another synthesis method, an LCST macromonomer may be obtained by controlled radical polymerization known as RAFT (Reversible-Addition Fragmentation chain Transfer) of LCST monomers in the presence of at least one crosslinking agent. Therefore, the macromonomer thus obtained is structured and may be used as a core for obtaining water-soluble copolymers in star-shaped form. The crosslinking agent may, in particular, be selected from the group comprising polyethylene unsaturated monomers (having at least two C=C unsaturated functions), such as, for example, vinyl, allylic and acrylic functions and, for example, and mention may be made, for example, of methylene bis acrylamide (MBA).

The LCST macromonomer may be obtained by the same technique but without using a crosslinking agent.

There are numerous reactions that may be implemented for couplings on monomers: alkylation, esterification, amidation, transesterification or transamidation.

In a preferred embodiment, the preparation of the LCST macromonomer is carried out by radical reaction between an LCST oligomer and a compound containing a C=C double bond, the double bond still being present after said radical reaction. Advantageously, the LCST oligomer has the characteristic of having a nitrogen or oxygen atom at its end, such as, for example, an alcohol or amine function, which is functionalized using a compound containing a C=C double bond. This compound containing a double bond is preferably selected from acryloyl chloride, acrylic acid, methacryloyl chloride, methacrylic acid, maleic anhydride, methacrylic anhydride, unsaturated aliphatic isocyanates, allyl chloride, allyl bromide, glycidyl acrylate, glycidyl methacrylate.

According to a particular embodiment, the LCST macromonomer may be of formula (I):

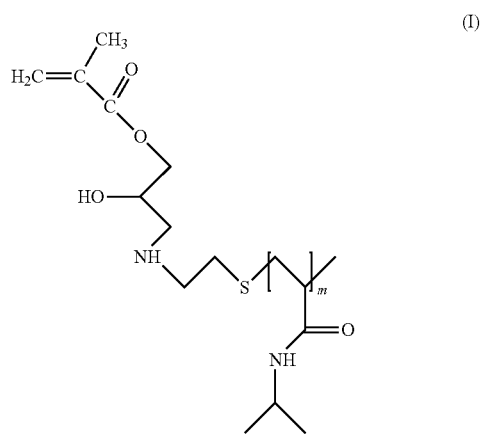

(I)

In which:

m is an integer advantageously between 2 and 40.

The LCST groups of the water-soluble polymer have a transition temperature by heating advantageously between 0 and 180° C. for a mass concentration in deionized water of 1% by weight of said LCST groups, preferably between 0 and 100° C., even more preferably between 10 and 80° C.

Inverse Polymer Emulsion

An inverse emulsion, otherwise called a water-in-oil emulsion, is composed of an oily phase, generally a lipophilic solvent or an oil, which constitutes the continuous phase in which water droplets comprising a polymer are in suspension, these water droplets forming a dispersed phase. An emulsifying surfactant (called water-in-oil surfactant) at the water/oil interface stabilizes the dispersed phase (water+polymer) in the continuous phase (lipophilic solvent or oil).

In inverse emulsions according to the prior art, an oil-in-water surfactant, which is an inverting agent, makes it possible to invert the emulsion and therefore to release the polymer when the emulsion is mixed with an aqueous fluid. For the purposes of the invention, it is not necessary to add an inverting surfactant (oil-in-water surfactant) to the inverse emulsion, including during its use. In other words, and preferably, the inverse emulsion according to the invention does not contain an oil-in-water surfactant and, in general, it is not necessary to add an oil-in-water surfactant in the fluid in which the emulsion is implemented, whether before, during or after the addition of the inverse emulsion in said fluid.

The inverse emulsion according to the invention may be prepared according to any method known to a person skilled in the art. Generally, an aqueous solution comprising the monomer(s) and the water-in-oil surfactant(s) is emulsified in an oily phase. Then, the polymerization of the monomers is carried out, advantageously by adding a free radical initiator.

Generally, the polymerization is carried out isothermally, adiabatically or at controlled temperature. In other words, the temperature is kept constant, usually between 10 and 60° C. (isothermal), or the temperature increases naturally (adiabatic) and, in this case, the reaction usually starts at a temperature below 10° C. and the final temperature is generally above 50° C. or, finally, the increase in temperature is controlled so as to have a temperature curve between the isothermal curve and the adiabatic curve.

The inverse emulsion according to the invention is preferably prepared according to the process comprising the following steps:
a) preparing an aqueous phase comprising at least one water-soluble monomer and at least one LCST macromonomer,
b) preparing an oily phase comprising at least one oil and at least one water-in-oil surfactant,
c) mixing the aqueous phase and the oily phase in order to form an inverse emulsion,
d) once the inverse emulsion is formed, polymerizing the monomers in the aqueous phase using a radical polymerization initiator.

In the inverse emulsion, the weight ratio of the aqueous phase to the oily phase is preferably from 30:70 to 90:10, more preferably from 70:30 to 80:20.

At the end of the polymerization reaction, it is also possible to dilute or concentrate the inverse emulsion obtained. Dilution is usually done by adding water, preferably salted, in the inverse emulsion. In this case, the inverse emulsion may be diluted to obtain a polymer concentration of up to 10% by weight. It is possible to concentrate the emulsion obtained, for example by distillation. In this case, the inverse emulsion may be concentrated and a polymer concentration of up to 60% by weight may be obtained.

As already discussed above, it is not necessary to add an inverting surfactant (oil-in-water surfactant) to the inverse emulsion during its preparation. In addition, the use of the inverse emulsion does not require an inverting surfactant.

However, it is possible to introduce an inverting surfactant. Indeed, as mentioned above, the object of the invention is to limit, and even eliminate, the use of an inverting surfactant to invert an inverse emulsion.

The oil of the inverse emulsion according to the invention advantageously denotes an oil or a solvent immiscible in water. The oil used to prepare the water-in-oil emulsion of the invention may be mineral oil, vegetable oil, synthetic oil, or a mixture of several of these oils. Examples of mineral oil are mineral oils containing saturated hydrocarbons of the aliphatic, naphthenic, paraffinic, isoparaffinic, cycloparaffinic or naphthyl type. Examples of synthetic oil are hydrogenated polydecene or hydrogenated polyisobutene; an ester such as octyl stearate or butyl oleate. ExxonMobil's Exxsol® products are suitable oils.

The inverse emulsion preferably comprises from 12 to 50% by weight of oil or lipophilic solvent, more preferably from 15 to 30% by weight.

The water-in-oil emulsion of step a) above preferably comprises from 30 to 55% by weight of water, more preferably from 35 to 48% by weight.

In the present invention, the term "inverse emulsion surfactant" or "emulsifying agent" or "water-in-oil surfactant" refers to an agent capable of emulsifying water in oil while an "inverting agent" or "oil-in-water surfactant" refers to an agent capable of emulsifying oil in water. More specifically, it is considered that an inverting agent is a surfactant having an HLB greater than or equal to 10, and that an emulsifying agent is a surfactant having an HLB less than 10.

The hydrophilic-lipophilic balance (HLB) of a chemical compound is a measure of the degree of hydrophilicity or lipophilicity, determined by calculating values for different regions of the molecule, as described by Griffin in 1949 (Griffin W C, Classification of Surface-Active Agents by HLB, Journal of the Society of Cosmetic Chemists, 1949, 1, pages 311-326).

In the present invention, we have adopted Griffin's method based on calculating a value based on the chemical groups of the molecule. Griffin assigned a dimensionless number between 0 and 20 to provide information on water and oil solubility. Substances with an HLB value of 10 are distributed between the two phases so that the hydrophilic group (molecular mass Mh) projects completely into the water while the lipophilic group (usually a hydrophobic hydrocarbon group) (molecular mass Mp) is in the non-aqueous phase.

The HLB value of a substance having a total molecular mass M, a hydrophilic part of a molecular mass Mh and a lipophilic part of a molecular mass Mp is given by the following formula:

$$HLB = 20(Mh/M)$$

The emulsifying agent (water-in-oil surfactant) may, in particular, be selected from surfactant polymers such as:
polyesters having a weight average molecular weight of between 1000 and 3000 g/mol, for example the products of condensation between a polyisobutenyl succinic acid or its anhydride and a polyethylene glycol,
block polymers having an average molecular weight by weight advantageously between 2500 and 3500 g/mol, for example those sold under the names Hypermer®,
sorbitan extracts such as sorbitan monooleate, sorbitan isostearate or sorbitan sesquioleate,
sorbitan esters,
diethoxylated oleoketyl alcohol
tetraethoxylated lauryl acrylate,
condensation products of higher fatty alcohols with ethylene oxide, such as the reaction product of oleyl alcohol with 2 ethylene oxide units;
condensation products of alkylphenols and ethylene oxide, such as the reaction product of nonylphenol with 4 units of ethylene oxide.

Products such as Witcamide® 511, betaine-based products and ethoxylated amines may also be used as water-in-oil emulsifiers.

The inverse emulsion may contain several water-in-oil emulsifying agents. It preferably contains between 0.8 and 20% by weight of water-in-oil emulsifier, more preferably between 1 and 10% by weight.

The radical polymerization initiator may be selected from initiators conventionally used in radical polymerization. These may be, for example, hydrogen peroxides, azo compounds or redox systems.

The water-in-oil emulsion according to the invention preferably comprises from 8 to 60% by weight of polymer, preferably from 12 to 40%.

The inverse emulsion may comprise from 1 to 40% by weight of salts, preferably from 3 to 30% by weight, more preferably from 5 to 25% by weight of salts.

The salts present in the water-in-oil emulsion may be, for example, sodium salts, lithium salts, potassium salts, magnesium salts, aluminum salts, ammonium salts, phosphate salts, sulfate salts, chloride salts, fluoride salts, citrate salts, acetate salts, tartrate salts, hydrogen phosphate salts, water-soluble inorganic salts, other inorganic salts and their mixtures. These salts include sodium chloride, sodium sulfate, sodium bromide, ammonium chloride, lithium chloride, potassium chloride, potassium bromide, magnesium sulfate, aluminum sulfate, and their mixtures. Sodium chloride, ammonium chloride and ammonium sulfate are preferred and their mixtures are even more preferred.

Property of the Inverse Emulsion

Thanks to the presence of LCST macromonomer units in the polymer, the inverse emulsion is capable of auto-inverting when it is used in water or a brine, although said emulsion may advantageously contain no inverting surfactant. In the absence of LCST macromonomer units in the polymer, inversion of the inverse emulsion requires the presence of an inverting surfactant such as an oil-in-water surfactant.

Thus, this particular property makes it possible to solve the environmental problems linked to the presence of an inverting surfactant. It also makes it possible to simplify the formulation of such emulsions.

This last advantage is particularly interesting when the surfactants must be selected specifically according to the composition of the medium in which the inverse emulsion is implemented (water or brine), and according to the temperature of that medium, which is the case in oil and gas recovery.

Uses of the Inverse Emulsion

The present invention also relates to a polymeric aqueous solution obtained by inversion of the inverse emulsion as described above in an aqueous medium, preferably in the absence of an oil-in-water surfactant. In other words, it is a process for inverting an inverse emulsion consisting in bringing it into contact with an aqueous medium, preferably in the absence of an oil-in-water surfactant.

The present invention also relates to the use of the inverse emulsion to thicken an aqueous medium, to flocculate suspended particles or to reduce the level of frictional resistance during transport of an aqueous medium.

Finally, the present invention also relates to the use of the inverse emulsion in the oil and gas recovery, in water treatment, in slurry treatment, in paper manufacturing, in construction, in the mining industry, in the formulation of cosmetic products, in the formulation of detergents, in textile manufacturing, or in agriculture.

Usually, the inverse emulsion is implemented by adding most often water, or a brine (such as sea water), in an aqueous medium. The polymer is released and dissolved or swelled in the aqueous medium.

The inverse emulsion may be advantageously prepared with the device and method of U.S. Pat. No. 8,383,560, in which the inverse emulsion is dissolved continuously with an arrangement of multiple static mixers.

The inverse emulsion is used such that the polymer concentration in the medium in which it is implemented is advantageously between 25 and 100,000 ppm by weight, more preferably between 50 and 10,000 ppm. This amount of polymer depends on the process in which the inverse emulsion is used.

The inverse emulsion according to the invention is particularly useful in the recovery of oil and gas. Indeed, oil and gas recovery companies use large quantities of inverse polymer emulsion and seek to limit the environmental impacts of their activities.

In addition, the inverse emulsions according to the invention can auto-invert under many conditions. More precisely, they auto-invert even under conditions generally considered difficult, or even extreme, in particular when the aqueous medium in which they are used is very salty and/or when their temperature is high. These advantages are highly sought after in the field of oil and gas recovery.

The inverse emulsion according to the invention is capable of auto-inverting in sea water but also in very concentrated brines.

Likewise, the inverse emulsion according to the invention is capable of auto-inverting even at high temperatures.

Oil and gas recovery processes are generally treatments of subterranean formations in which a polymer is used to increase the viscosity of the aqueous injection fluid and/or to reduce the level of frictional resistance that occurs during the injection of said fluid into a subterranean formation, or even to punctually or permanently plug a part of the subterranean formation.

These subterranean treatments include, but are not limited to, drilling operations, stimulation treatments such as fracturing operations, completion operations and the improved process of oil recovery by sweeping with a polymer solution.

The present invention also relates to a method for fracturing an underground formation, which comprises:

aa) providing an inverse emulsion as described above;
bb) inverting the inverse emulsion by adding it to an aqueous fluid in order to form an injection fluid;
cc) optionally, adding at least one propping agent in the injection fluid;
dd) introducing the injection fluid into part of the subterranean formation;
ee) fracturing the underground formation with the injection fluid.

The present invention also relates to a process for the improved recovery of hydrocarbons (oil and/or gas) by sweeping in a subterranean formation, which comprises:

aaa) providing an inverse emulsion as described above;
bbb) inverting the inverse emulsion by adding it to an aqueous fluid to form an injection fluid;
ccc) introducing the injection fluid into part of the subterranean formation;
ddd) sweeping part of the subterranean formation with the injection fluid;
eee) recovering a mixture of hydrocarbons and aqueous fluid.

The following characteristics apply to the previous two processes (fracturing and oil and/or gas recovery).

Advantageously, the inverse emulsion according to the invention does not contain an inverting surfactant and it is advantageously not necessary to add an inverting surfactant in the fluid in which the inverse emulsion is implemented, whether before, during or after adding the inverse emulsion to said fluid. Thus, advantageously, the use of the inverse emulsion according to the invention does not require the presence of an oil-in-water surfactant.

The aqueous fluid may be a brine containing monovalent and/or polyvalent salts or combinations thereof. Examples of salts include, without limitation, sodium salts, lithium salts, potassium salts, magnesium salts, aluminum salts, ammonium salts, phosphate salts, sulfate salts, chloride salts, fluorinated salts, citrate salts, acetate salts, tartrate salts, hydrogen phosphate salts, soluble inorganic salts, other inorganic salts and mixtures thereof.

The brine may contain more than 30,000 ppm of salts, preferably more than 70,000 ppm, even more preferably more than 100,000 ppm. The brine may be saturated with salts.

The temperature of the aqueous fluid in which the inverse emulsion according to the invention is inverted is advantageously between 25° C. and 160° C., preferably greater than 40° C., more preferably greater than 60° C., even more preferably greater than 80° C., and even more preferably greater than 90° C.

The concentration of water-soluble copolymer in the aqueous injection fluid is advantageously between 50 and 50,000 ppm by weight, preferably between 100 and 30,000 ppm, more preferably between 500 and 10,000 ppm relative to the weight of the injection fluid.

The injection fluid may also include other components such as an alkaline agent, a propping agent, corrosion inhibitors, acids, scale inhibitors, guars, guar derivatives, crosslinkers such as zirconium, titanate or borate.

The water or brine used for the preparation of the injection fluid may be produced water. The term "produced water" refers to all salted or unsalted water, brines, sea water, aquifer water which come from a hydrocarbon reservoir. This produced water may be treated prior to the preparation of the injection fluid, for example as described in patent application WO 2018/020175.

Advantageously, the injection fluid has, at the time of its injection, a viscosity of between 1 and 200 cps (centipoise) (viscosity measurements at 20° C. with a Brookfield viscometer equipped with a UL module and at a speed of 6 rpm).

The implementation of the inverse emulsion according to the invention is carried out on site, just upstream of the injection, into the oil field, of the injection fluid in which it is implemented. In general, the inverse emulsion is added to a more or less salty brine depending on the oil fields. Other components, such as, for example, biocides, anti-corrosion agents, or propping agents, are also introduced into this fluid to prepare the injection fluid. Most often, they are added to a circulation line of the aqueous solution or the brine.

The present invention will be disclosed in more detail with reference to the following examples and figures. The following examples simply illustrate the invention and are not intended to be limiting. Unless otherwise indicated, all percentages are by weight.

FIGURES

EXAMPLES OF EMBODIMENT OF THE INVENTION

Figure 1:
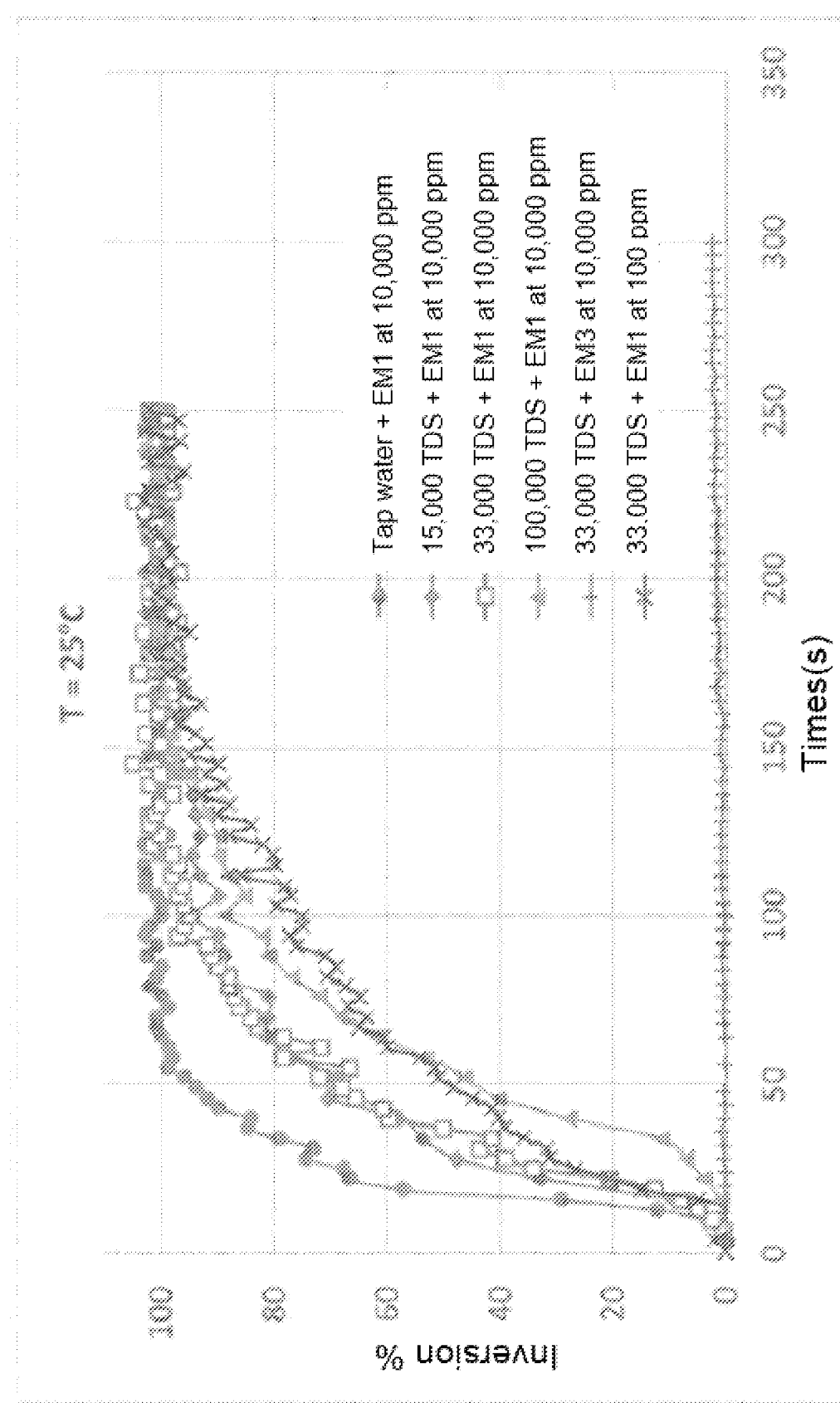
FIG. 1 is a graph showing the change in the percentage of inversion of the EM1 inverse emulsion over time, in different fluids at a temperature of 25° C.

1/ Synthesis of Telomers (or LCST Oligomers)

To prepare a Telomere called T1, the following process is carried out.

In a dual jacketed reactor:

A hydroalcoholic solution (410 g) and the N-isopropylacrylamide (NIPAM, 113 g, or 1 mol), butyl methacrylate (7.9 g, or 0.055 mol) and acrylic acid (4.44 g, or 0.055 mol) monomers are loaded.

The mixture is stirred.

The pH of the mixture is adjusted to between 4.0 and 5.0 using a 40% by weight NaOH solution in water.

The mixture obtained is heated to 50° C.

The mixture is de-oxygenated with nitrogen bubbling for 40 minutes.

Aminoethanethiol HCl (2.5 g) is added.

2,2'-azobis(2-methylpropionamidine)dihydrochloride (0.22 g) is added to initiate telomerization.

After stabilization of the temperature, the mixture is stirred for 2 hours and then cooled to 25° C.

A concentrated viscous solution containing 23% by weight of a telomer with a degree of polymerization of 50 monomer units (DPn 50) is obtained. The LCST of this T1 telomere was estimated at 38° C. according to the process described above.

To prepare a Telomere called T2, the following process is carried out.

In a dual jacketed reactor:

The N-isopropylacrylamide (NIPAM, 113 g, or 1 mol), butyl methacrylate (4.44 g, or 0.031 mol) and chloromethyl dimethylamino-ethyl methacrylate (MADAME·MeCl, 2.16 g, or 0.01 mol) monomers are loaded in 445 g of a hydroalcoholic solution.

The mixture is stirred.

The pH of the mixture is adjusted to between 4.0 and 5.0 using a 40% by weight NaOH solution in water.

The mixture obtained is heated to 50° C.

The mixture is de-oxygenated with nitrogen bubbling for 40 minutes.

Aminoethanethiol HCl (2.35 g) is added.

2,2'-azobis(2-methylpropionamidine)dihydrochloride (0.22 g) is added to initiate the polymerization.

After stabilization of the temperature, the mixture is stirred for 2 hours and then cooled to 25° C.

A concentrated viscous solution containing 21% by weight of a telomer with a degree of polymerization of 50 monomer units (DPn 50) is obtained. The LCST of this T2 telomere was estimated at 32° C. according to the process described above.

TABLE 1

List and monomeric compositions of T1 and T2 telomeres.

| Telomere | LCST monomer (A), mol % | Hydrophilic monomer (B), mol % | Hydrophobic monomer (C), mol % | LCST telomere (° C.) |
|---|---|---|---|---|
| T1 | NIPAM, 90 | Acrylic acid, 5 | Butyl methacrylate, 5 | 38 |
| T2 | NIPAM 96 | MADAME·MeCl, 1 | Butyl methacrylate, 3 | 32 |

2/ Synthesis of Macromonomers

The following process is carried out to prepare a macromonomer called M1.

In a dual jacketed reactor:
- 400 g of Telomere T1 solution (5581 g/mol) at 23% by weight are loaded in water.
- The solution is stirred.
- The pH of the solution is adjusted to 7.5 using a 40% by weight NaOH solution in water.
- The solution is cooled to 5° C.
- Using a burette, 3.0 g of acryloyl chloride are added dropwise.
- The pH is continuously adjusted between 7 and 9 using a 40% by weight NaOH solution in water.
- The temperature is maintained at 5° C. throughout the reaction.
- After the end of the reaction, the solution is stirred for 2 hours while continuously checking the pH.

A concentrated viscous solution containing 21.5% by weight of LCST macromonomer M1 (5711 g/mol) is obtained.

The macromonomer M2 is prepared using the same process, with the telomer T2 (5740 g/mol). A concentrated viscous solution containing 21.5% by weight of LCST macromonomer M2 (5869 g/mol) is obtained.

3/ Synthesis of Polymers in Inverse Emulsion

The following process is carried out to prepare an inverse emulsion called EM1.

In order to prepare the aqueous solution of monomers, 146 g (74.997 mol %) of acrylamide, 157 g (25 mol %) of ATBS (2-acrylamido 2-methylpropane sulfonic acid), 0.5 g (0.003 mol %) of LCST macromonomer M1 and 370 g of water are loaded into a beaker. The pH of the monomer solution is adjusted between 5 and 6 using NaOH.

The following additives are added:
- 0.37 g of Versenex 80 (complexing agent),
- 1.29 g of TBHP (terbutylhydroperoxide) (oxidant).

295 g of Exxsol D100 and 30 g of Span 80 are mixed before being transferred into a reactor together with the aqueous phase. Emulsification of the two-phase mixture is carried out using a mixer, this mixture is deoxygenated using an inert gas and then cooled to a temperature of 15° C.

The synthesis starts with the addition of a solution of MBS (sodium metabisulphite, 1 g/l) at a flow rate of 1 ml/min. The temperature of the medium increases until it reaches a value of 40° C., which is maintained for 2 hours.

The reaction medium is allowed to cool. An inverse emulsion with a polymer concentration of 30% by weight is thus obtained.

An EM2 inverse emulsion is prepared according to the same process, with the LCST macromonomer M2. An EM2 inverse emulsion with a polymer concentration of 30% by weight is obtained.

As a counterexample, the EM3 inverse emulsion is prepared according to the same process, but without using an LCST macromonomer. In other words, the 0.003 mol % of LCST macromonomer is replaced by 0.003 mol % of acrylamide.

4/ Test

The test consists of studying the inversion of inverse emulsions over time, in different brines and at different temperatures. The inversion is characterized by a release of the polymer chains into the aqueous medium and thus by an increase in its viscosity.

Materials and Method

The speed of inversion is studied using Thermo instrument's iQ Rheometer. During the inversion test, the stress is recorded as a function of time. It increases in proportion to the viscosity released.

The EM1, EM2 and EM3 inverse emulsions are tested, without any inverting agent being added to them.

Four different fluids were used: tap water, and three brines of different concentrations: 15,000 TDS (Total Dissolved Solids) (1.5% by weight of NaCl), 33,000 TDS (3% by weight of NaCl and 0.3% by weight of $CaCl_2$)), and 100,000 TDS (10% by weight of NaCl). The TDS corresponds to the quantity in ppm of organic and inorganic substances contained in a brine. In other words, 15,000 TDS equals 15,000 mg of salt per liter of fluid.

The tests were carried out at 2 different temperatures: 25° C. and 80° C.

To this end, 1.2 g of inverse emulsion are injected into 34 ml of brine under rotation of the elliptical module (U1) at 800 rpm. The emulsions are tested such that the polymer concentration is 10,000 ppm (by weight) in the four fluids. Another test is carried out with the same emulsions but at a concentration of 100 ppm (by weight), only in brine (33,000 TDS).

5/ Results

The test results are recorded in the graphs of FIGS. 1 to 4. In these figures, the curves for the EM3 inverse emulsion are identical, regardless of the nature of the fluid and the temperature. Therefore, only one curve appears for the EM3 emulsion, that implemented in a brine of 33,000 TDS.

Figure 2:
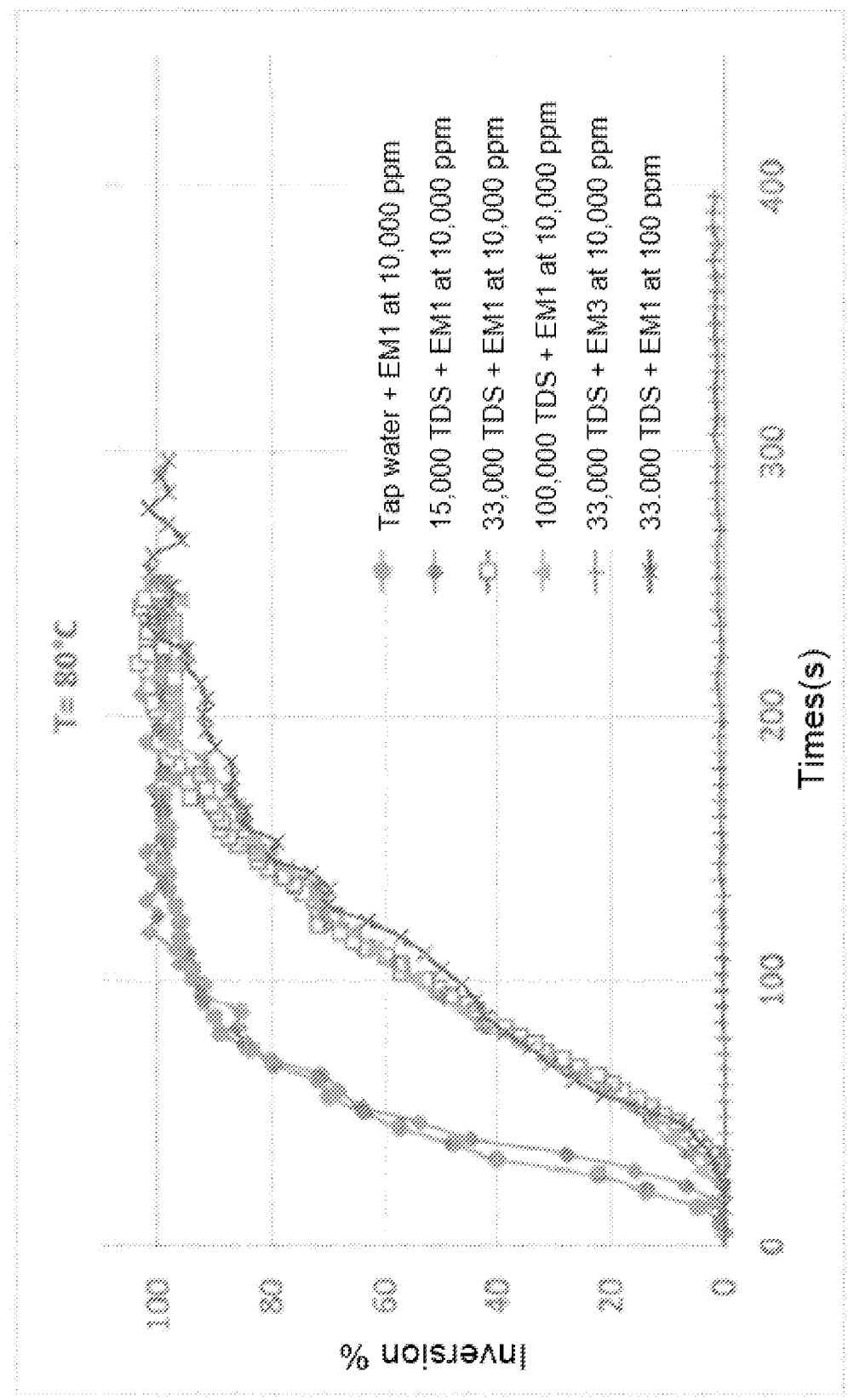
FIG. 2 is a graph showing the change in the percentage of inversion of the EM1 inverse emulsion over time, in different fluids at a temperature of 80° C.

As shown in FIGS. 1 and 2, the EM1 inverse emulsion according to the invention, in which the polymers comprise M1 macromonomer units, rapidly inverts in a very wide range of brine compositions ranging from tap water to a 10% salt brine (100,000 TDS), both at low temperature (25° C.) and at high temperature (80° C.). The EM1 emulsion also inverts very well at 100 ppm in brine at 33,000 TDS.

Conversely, the EM3 inverse emulsion, which does not include an LCST macromonomeric unit, does not invert at all regardless of the fluid and the temperature.

Figure 3:
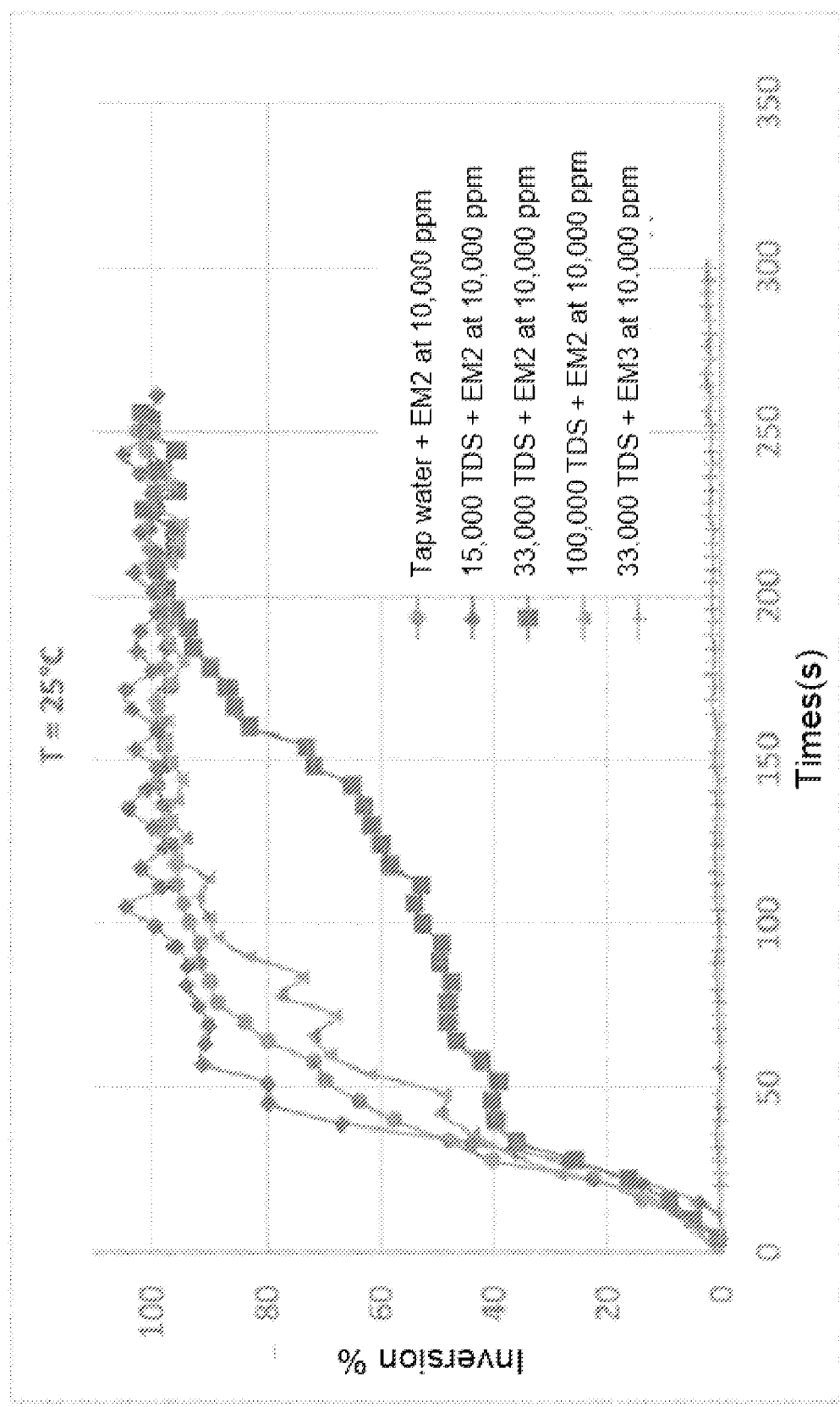
FIG. 3 is a graph showing the change in the percentage of inversion of the EM2 inverse emulsion over time, in different fluids at a temperature of 25° C.
Figure 4:
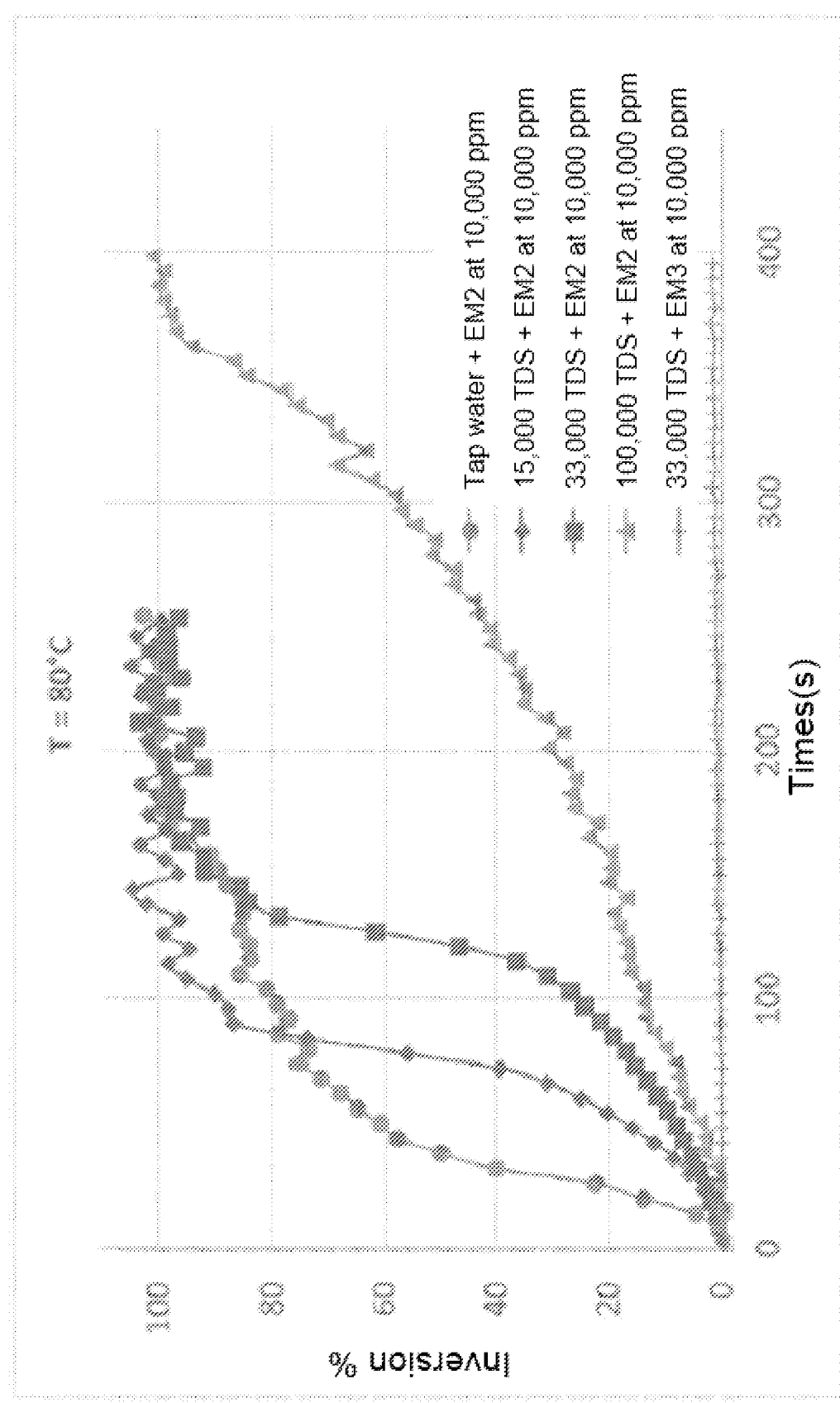
FIG. 4 is a graph showing the change in the percentage of inversion of the EM2 inverse emulsion over time, in different fluids at a temperature of 80° C.

The same results are obtained with the EM2 inverse emulsion as shown in FIGS. 3 and 4. The EM2 emulsion inverts under all brine and temperature conditions, while the EM3 emulsion does not invert. The EM2 emulsion also inverts very well at 100 ppm in brine at 33,000 TDS.

Consequently, the auto-inverting behavior of the EM1 and EM2 emulsions according to the invention is clearly observed, while these emulsions do not contain an inverting agent.

These auto-inverting properties are highly sought after by users of inverse emulsions because they avoid all of the potential problems associated with the use of an inverting agent.

The invention claimed is:

1. An auto-invertible inverse emulsion comprising:
   oil;
   water;
   at least one water-in-oil surfactant; and
   at least one polymer having a molecular weight of between 5 and 30 million g/mol and containing monomer units of at least acrylamide, 2-acrylamido 2-methylpropane sulfonic acid (ATBS), and $10^{-5}$ to 5 mol % of a lower critical solution temperature (LCST) macromonomer, said LCST macromonomer having a molecular weight of between 500 and 200,000 g/mol and having units from:

at least one anionic monomer selected from acrylic acid and ATBS; and at least one LCST monomer selected from diethylacrylamide, N-isopropylacrylamide, dimethylacrylamide, and ter-butylacrylamide.

2. The inverse emulsion according to claim 1, wherein the inverse emulsion is free of oil-in-water surfactant.

3. A method for preparing an inverse emulsion according to claim 1, said method comprising the following steps:
   a) preparing an aqueous phase comprising at least one water-soluble monomer and at least one LCST macromonomer,
   b) preparing an oily phase comprising at least one oil and at least one water-in-oil surfactant,
   c) mixing the aqueous phase and the oily phase in order to form an inverse emulsion, and
   d) once the inverse emulsion is formed, polymerizing the monomers in the aqueous phase using a radical polymerization initiator.

4. A polymeric aqueous solution obtained by inversion of the inverse emulsion according to claim 1 in an aqueous medium in the absence of an oil-in-water surfactant.

5. Use of the inverse emulsion according to claim 1 for thickening an aqueous medium, for flocculating suspended particles or for reducing the level of frictional resistance during transport of an aqueous medium.

6. A method for fracturing an underground formation, which comprises:
   aa) providing an inverse emulsion according to claim 1;
   bb) inverting the inverse emulsion by adding it to an aqueous fluid in order to form an injection fluid;
   cc) optionally, adding at least one propping agent in the injection fluid;
   dd) introducing the injection fluid into part of the subterranean formation; and
   ee) fracturing the underground formation with the injection fluid.

7. A method for the improved recovery of hydrocarbons by sweeping in an underground formation, which comprises:
   aaa) providing an inverse emulsion according to claim 1;
   bbb) inverting the inverse emulsion by adding it to an aqueous fluid in order to form an injection fluid;
   ccc) introducing the injection fluid into part of the subterranean formation;
   ddd) sweeping part of the subterranean formation with the injection fluid; and
   eee) recovering a mixture of hydrocarbons, gas and aqueous fluid.

8. The inverse emulsion according to claim 1, wherein the LCST macromonomer has a weight average molecular weight between 1,000 and 100,000 g/mol.

* * * * *